J. S. EDWARDS.
EARTHWORKING IMPLEMENT.
APPLICATION FILED OCT. 19, 1918.
1,294,067.
Patented Feb. 11, 1919.
2 SHEETS—SHEET 1.
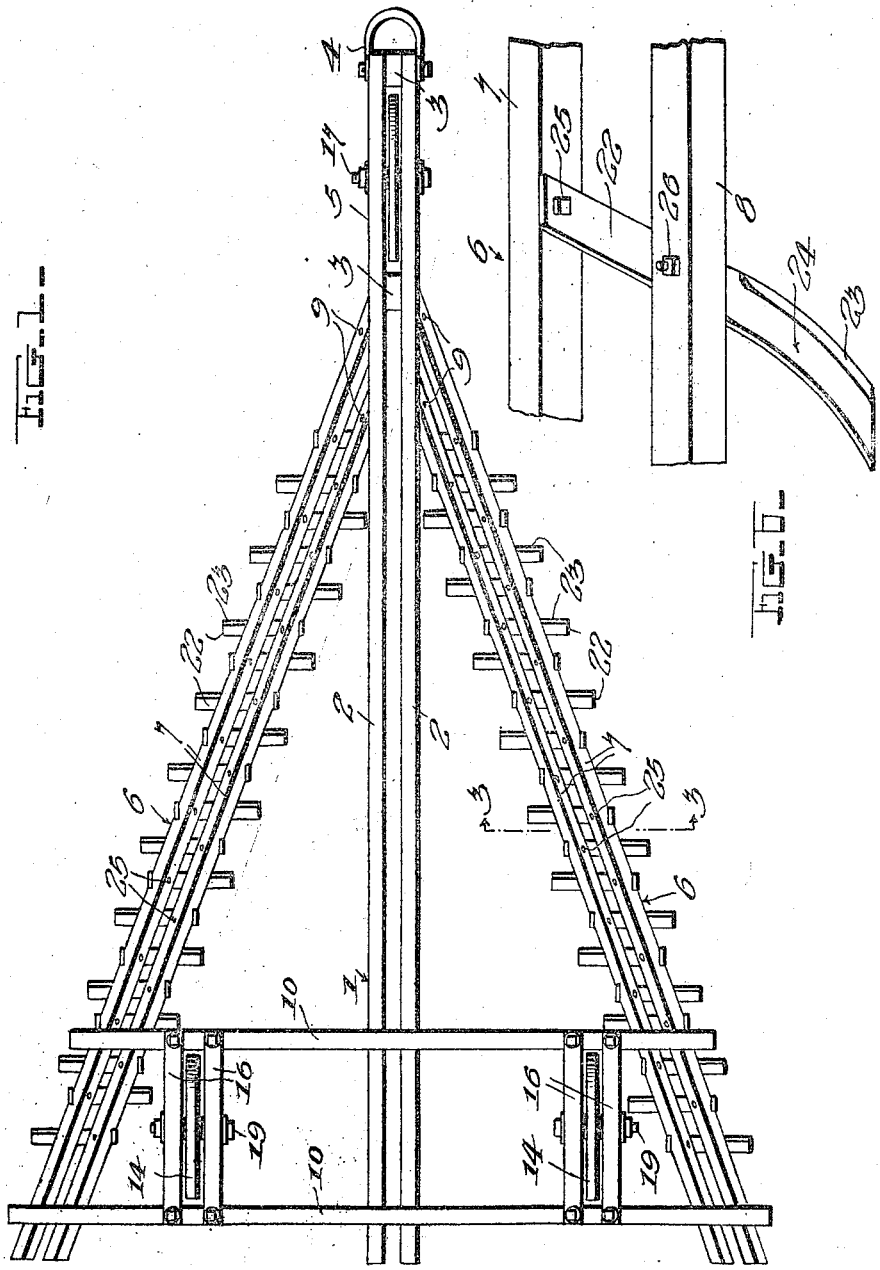
Witnesses
H. Woodard
E. Johnson
Inventor
J. S. Edwards,
By O. E. Howes
Attorney

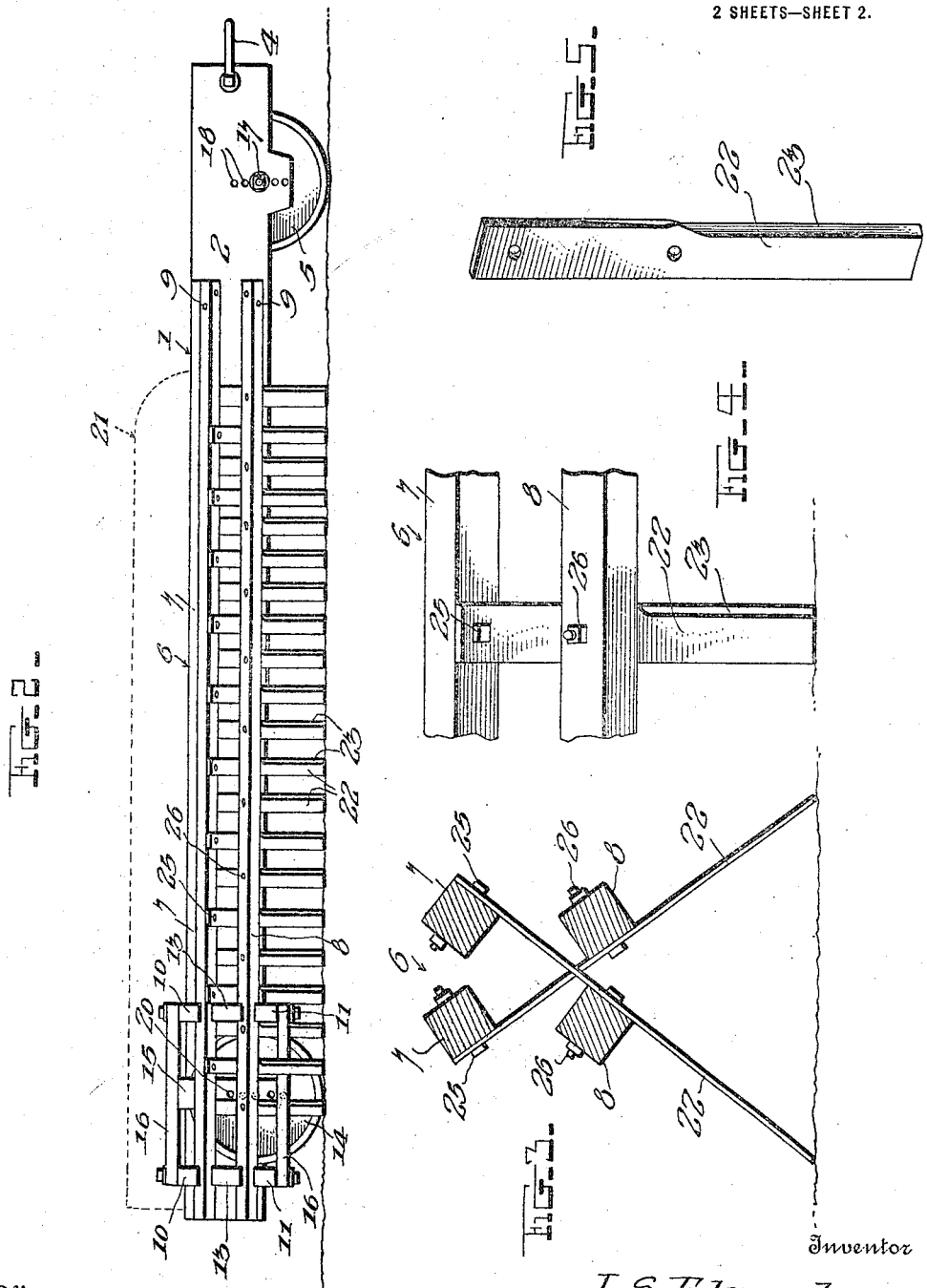

UNITED STATES PATENT OFFICE.

JOSE S. EDWARDS, OF HELPER, UTAH.

EARTHWORKING IMPLEMENT.

1,294,067.　　　　Specification of Letters Patent.　　Patented Feb. 11, 1919.

Application filed October 19, 1918. Serial No. 258,811.

*To all whom it may concern:*

Be it known that I, JOSE S. EDWARDS, citizen of the United States, residing at Helper, in the State of Utah, have invented certain new and useful Improvements in Earthworking Implements, of which the following is a specification.

This invention relates to improvements in earth working implements, more particularly to an improvement for grubbing and cutting up sage and other brush and for pulverizing the soil.

The object of the invention is to provide a simple strong and durable implement of this character which will very effectively cut and tear up the roots of sage brush and the like and which at the same time will be light in draft.

With the above and other objects in view the invention consists of certain novel features of construction, and the combination and arrangement of parts hereafter fully described and claimed, and illustrated in the accompanying drawings:

Figure 1 is a top plan view of a sage brush grubber embodying my invention.

Fig. 2 is a side elevation of the same.

Fig. 3 is a detailed vertical section taken on line 3—3 of Fig. 1.

Fig. 4 is a side elevation of parts shown in Fig. 3.

Fig. 5 is a perspective view of one of the straight knives.

Fig. 6 is a view similar to Fig. 4 showing a knife with a curved lower end set in an outwardly and rearwardly inclined position.

Referring more particularly to the drawings it will be noted on reference to Fig. 1 that the implement is preferably made in substantially A shape and includes a central or main draft beam 1, here shown as composed of two heavy boards 2, spaced apart by suitable blocks 3. A clevis 4 is attached to the front end of the draft beam 1 and that end is supported by a ground wheel 5, arranged between the boards or members 2 of this beam.

Extending rearwardly and outwardly from each side of the draft beam 1, are two knife carrying frames 6, each of which is composed of upper and lower pairs of bars 7, 8, having their front ends bolted or otherwise suitably secured at 9, to the outer sides of the beam 1. The diverging rear ends of the bars 7, 8 are suitably fastened to upper and lower pairs of cross bars 10, 11, secured to the upper and lower edges respectively of the boards 2. The bars 7, 8 of frames 6 are further secured to the boards 2 and are spaced apart from each other by bars 13, arranged between them and in vertical alinement with the cross bars 10, 11, as clearly shown in Fig. 2. To support the rear end of the implement, a pair of spaced ground wheels 14 is provided as shown in Fig. 1, and they are arranged between standards 15, which depend from spaced forwardly and rearwardly extending bars 16 bolted at their ends to the cross bars 10.

While any suitable means may be provided for adjusting the wheels 5 and 14 vertically with respect to the framework of the implement, I have shown these wheels mounted on axles in the form of bolts. The axle 17 of the front wheel 5 is adapted to be positioned in any one of a vertical series of openings 18, in the boards 2, as clearly shown in Fig. 2, while the bolts or axles 19 of the rear wheels 14 are similarly inserted in vertical series of openings 20, formed in the upright 15. When this adjustment of the wheels is provided, I preferably mount on top of the bars 7 and 10 a pair of longitudinally extending runners 21, so that when the implement is to be moved over a road or the like, it may be inverted so as to slide on such runners which are indicated in dotted lines in Fig. 2. It will be understood, however, that levers or other devices may be provided for quickly raising and lowering the wheels 5, 14.

In order to effectively cut and tear up the roots of sage and other brush, I provide on the rearwardly diverging frames 6, rows of cutting knives 22, which have their front edges beveled to form cutting edges 23, and which may have either straight lower ends as shown in Fig. 5 or curved lower extremities as shown at 24 in Fig. 6. These cutting knives 22 of each row, extend downwardly and outwardly as clearly shown in Fig. 3, wherein it will be seen that their upper portions cross each other, and the upper end of each knife is bolted at two points to the diagonally opposite bars of the frame 6. In other words, each cutting knife or blade 22 has its upper end bolted at 25 to one of the bars 7 and its intermediate portion bolted at 26 to the diagonally opposite bar 8. The knives of the two series project alternately in opposite directions as will be seen on reference to Fig. 1, and because of this arrangement they will be out of alinement longitudinally to the implement and will thus present a large number of cutting edges to the roots and stems of the brush. If desired, each of the knives 22 may be inclined in a downward and rearward direction, as indicated in Fig. 6, which arrangement will of course lighten the draft of the implement. Owing to the crossed arrangement of the knives as shown in Fig. 3, and their attachment to diagonally opposite bars of the frames 6, such bars will be effectively secured together and braced to provide a strong open frame or beam.

In operation, a light tractor or suitable number of draft animals are hitched to the clevis 4 and as the implement is drawn through the ground at a depth determined by the adjustment of the wheels 5, 14, the cutting edges of the knives will effectively cut the roots and stems, and it has been found in practice that what are not cut by knives are so torn up, that such roots or stems may be readily pulled out by hand. It is also found that the implement puts the ground in a well pulverized condition, and that it will not readily become clogged, specially where the knives are inclined rearwardly as shown in Fig. 6.

It will be understood that instead of making the framework of wood as shown, it may be made of channel and angle iron members, and it is to be further understood that other slight changes in the form, proportion, and arrangement of parts, may be resorted to without departing from the spirit or sacrificing any of the advantages of the invention as defined in the appended claim.

I claim:

An implement of the character described, comprising a main draft beam, rearwardly diverging knife carrying frames secured thereto, each of said frames including upper and lower pairs of spaced bars, two series of cutting knives on said frames, the knives of one series intersecting those of the other and secured at their upper and intermediate portions to diagonally opposite bars, whereby the cutting portions of the knives incline downwardly and outwardly from said diverging frames.

In testimony whereof I affix my signature in presence of two witnesses.

JOSE S. EDWARDS.

Witnesses:
F. SLUG,
S. T. THORNTON.

Copies of this patent may be obtained for five cents each, by addressing the "Commissioner of Patents, Washington, D. C."